July 21, 1925.
H. E. BRANDT
1,546,966
DUPLEX POWDER DUSTER FOR SADDLES
Filed May 14, 1924
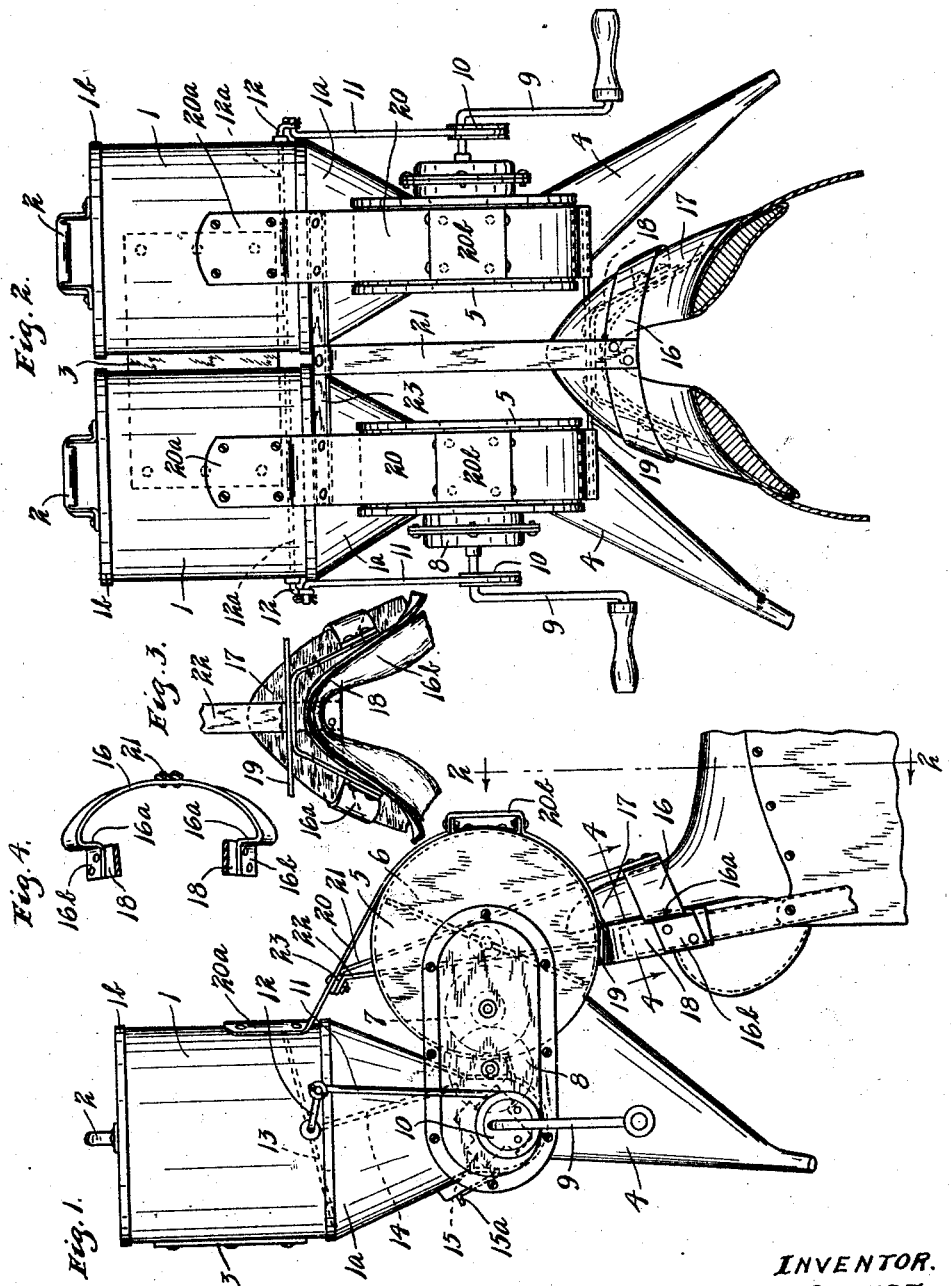
INVENTOR.
HENRY E. BRANDT.
BY HIS ATTORNEY.

Patented July 21, 1925.

1,546,966

UNITED STATES PATENT OFFICE.

HENRY E. BRANDT, OF NORTH ST. PAUL, MINNESOTA, ASSIGNOR TO DOBBINS MANUFACTURING COMPANY, OF NORTH ST. PAUL, MINNESOTA, A CORPORATION OF SOUTH DAKOTA.

DUPLEX POWDER DUSTER FOR SADDLES.

Application filed May 14, 1924. Serial No. 713,338.

*To all whom it may concern:*

Be it known that I, HENRY E. BRANDT, a citizen of the United States, residing at North St. Paul, in the county of Ramsey and State of Minnesota, have invented certain new and useful Improvements in Duplex Powder Dusters for Saddles; and I do hereby declare the following to be a full, clear, and exact description of the invention, such as will enable others skilled in the art to which it appertains to make and use the same.

This invention relates to a dusting or spraying apparatus, and particularly to such an apparatus adapted to be supported upon a saddled animal. It is now the common practice to spray dust or other insecticide substances upon growing plants, such as cotton, tobacco, potatoes, etc. Where comparatively large areas of such plants are to be thus treated it is particularly necessary to carry the dusting apparatus by other than man power. It has been found to be very convenient in some places, particularly in the South where cotton is treated, to use a mule for this purpose and to mount the dusting or spraying apparatus upon a saddle carried by said mule.

It is an object of this invention, therefore, to provide a spraying or dusting apparatus having means for carrying the material to be sprayed or dusted and laterally downwardly directed nozzles through which the material is distributed, together with a frame for carrying the device having a portion adapted to fit over and be firmly supported upon the horn of a saddle so that the saddled animal can progress between two rows of plants, which plants will simultaneously be treated by the nozzles.

It is a further object of the invention to provide such a device preferably comprising two receptacles each having a downwardly and laterally directed nozzle and an operating means for blowing the material through the nozzle, said operating means being disposed reversely and in oppositely extending directions at the outer sides of said device and said nozzles being oppositely directed, said device having a frame with a portion comprising a downwardly flaring flat band adapted to fit around the front and rear of the horn of a saddle.

These and other objects and advantages of the invention will be fully set forth in the following description made in connection with the accompanying drawings, in which like reference characters refer to the same parts through the different views, and in which,—

Fig. 1 is a view in side elevation of the device showing a portion of a saddle on which it is mounted;

Fig. 2 is a view in rear elevation of the device also showing a sectional part of a saddle on which it is mounted;

Fig. 3 is a partial view in front elevation of the device, also showing a portion of the saddle; and Fig. 4 is a substantially horizontal section taken on the line 4—4 of Fig. 1, as indicated by the arrows.

Referring to the drawings, means are shown for carrying the material to be dusted, and while this means may take various forms, in the embodiment of the invention illustrated the receptacles 1 are shown having cylindrical upper portions and inverted conical lower portions $1^a$. The receptacles have tightly fitting lids $1^b$ provided on the tops with suitable bail handles 2 by which the device can normally be carried. The receptacles 1 are connected together at their forward portions by a flat plate 3 extending therebetween and riveted or bolted thereto. The conical portions $1^a$ extend downwardly to chutes 4 connected thereto, which chutes extend laterally and downwardly from the lower end of the portions $1^a$. The chute 4 is of considerable width forwardly and rearwardly at its top and at its rear side communicates with a fan chamber in casing 5 of substantially cylindrical form. A fan having oppositely disposed blades 6 is disposed in the casing 5 and driven by a plurality of meshing gears 7 journaled on shafts extending through an oblong comparatively flat casing 8, the forward pair of said gears being secured on a shaft, one end of which projects through the casing 8 and is down-turned to form a handle-equipped crank 9. Adjacent the crank 9 said shaft carries a grooved eccentric wheel 10 which is embraced by the loop at one end of a rod 11 extending up to one side of the container 1 where it is pivotally connected to one end of an arm 12 formed on the end of a rod $12^a$ extending across and journaled in the sides of the container 1. The rod 12 carries an agitator 13 which is rigid and oscillatable therewith and an agitator 14 also extends downwardly in the conical portion 1ª and is rigidly secured to the rod 12ª. The shaft on which crank 9 is formed carries a small vaned distributing wheel 15 moving adjacent the semi-cylindrical bottom of the portions 1ª and acts to force the material through slots in the bottom of said portion 1ª. The slots in the bottom of the portion 1ª are adjustable as to size by a slitted strip slidable thereacross (not shown), which strip is adjusted by a rotating eccentric controlled by an oscillating handle 15ª disposed at the forward portions of the conical portions 1ª of the receptacles. It will be noted that the cranks 9 are disposed in opposite directions at each side of the device.

A frame is formed to support the parts described and comprises a curved flat downwardly flaring band 16 having inwardly projecting portions 16ª adjacent its ends, which band is adapted to fit down over the horn 17 of a saddle. While any suitable type of saddle may be used, in the embodiment of the invention illustrated, a well known form of Army saddle is shown, which type of saddle is much used in the cotton growing sections. The horn 17 is tapered and the flaring form of the band 16 is correspondingly formed. The portions 16ª have outwardly and forwardly directed end portions 16ᵇ which are riveted to upwardly converging flat bars 18 disposed at each side of the upwardly tapering saddle portion 17ª projecting a short distance in front of the horn 17. The bars 18 are integrally connected at their tops by a horizontal portion which is bolted or riveted to a cross bar 19 which extends laterally and has its ends disposed under the frame casings 5. Straps or thin flat bars 20 are riveted to the ends of the bar 19 and to the fan casings and extend around the latter in engaging relation therewith to substantially the top portion of the said casing and extend tangentially to the casing to the rear sides of the receptacles 1 where they are provided with curved flanges 20ª engaging and riveted to said receptacles. The strap 16 has connected to its front portion centrally thereof a bar 21 extending upwardly and forwardly and another bar of substantially the same width and size 22 is bolted to the top of the bar 19 centrally thereof and extends upwardly and forwardly, the bars 21 and 22 having their upper ends bent parallel to the upper portion of the strap 20 and disposed at its upper and lower sides, respectively, of a transverse horizontally extending bar 23 which, at its ends, is riveted or bolted to the straps 20. The straps 20 at the forward portions of the fan casing 5 are formed as bails or handles 20ᵇ. The interior parts of the duster, such as the gear, fan and discharge regulating means, are substantially the same as shown and described in my co-pending application S. N. 645,196, filed June 13, 1923, to which reference may be had for a fuller disclosure of such parts.

In operation, the device will be mounted upon the horn of a saddle carried on the back of a mule or other animal and the band 16 with its angularly projecting portions 16ª will wedge downwardly on the horn of said saddle so that the device is held rigidly and securely in position. Any jolting which occurs only serves to more firmly wedge the band 16 into position. The device cannot swing forwardly or backwardly owing to the portions 16ª and cannot swing laterally on the horn of the saddle, and so is supported thereon with great rigidity. The material to be dusted or sprayed now being placed in the containers 1 the operator can sit in the saddle and turn the cranks 9 with either hand. The nozzles 4 will blow the material downwardly at either side of the operator onto the plants in the rows at both sides of the operator. The material being blown downwardly in advance of the saddle the operator can see how the material is distributed and that the plants are satisfactorily covered. The material will be agitated in the receptacles by the members 13 and 14 and will be forced into the nozzles by the vaned wheel 15. The fan 6 will be driven by the gears 7 when the crank 9 is operated, which crank will also operate the agitators through the rods 11. The operation of these various parts will be clearly understood from the drawing or from the showing made in my prior application, supra. With the sprayer positioned and operated, as described, a large area of plants can be effectively and efficiently treated. It is the common practice in the Southern States to use a mule in the cotton fields and most of the planters have a saddle of the Army type for such a mule. The device will therefore have utility in such districts where cotton is grown or in other districts where it is desired to quickly and effectively dust two rows of plants simultaneously with the use of a saddled animal.

From the above description it is seen that applicant has provided a simple and efficient spraying and dusting device. The same is ruggedly made and requires practically no attention for maintenance. While various material may be used, it has been found that a metal coated with aluminum casing is very efficient. The device is being commercially made, has been amply demonstrated and found to be very successful and efficient.

It will, of course, be understood that various changes may be made in the form, details, arrangement and proportions of the parts without departing from the scope of applicant's invention, which, generally stated, consists in a device such as shown and described and set forth in the appended claims.

What is claimed is:

1. A dusting or spraying apparatus comprising a receptacle for holding the material to be dusted or sprayed, a nozzle connected to said receptacle, means for discharging the material from said receptacle through said nozzle, and a frame member supporting said apparatus having spaced downwardly flaring parts adapted to fit over and wedge on the horn of a saddle whereby said apparatus may be carried on a saddled animal.

2. A dusting apparatus comprising a pair of receptacles, a laterally and downwardly directed nozzle in each receptacle, means for discharging powder from said receptacles through said nozzles comprising a crank for each nozzle, a frame connecting and supporting said receptacles, said nozzles being directed oppositely from the center of said frame, said cranks being disposed at the outer opposite sides of said apparatus, said frame having a downwardly flaring band at its bottom shaped to fit and wedge over the horn of a saddle whereby one of said nozzles is disposed at each side of said saddle and a saddled animal may walk between rows of plants with a nozzle disposed over each row so that the plants in said rows simultaneously may be dusted and said band will wedge down on and be maintained in firm engagement with said horn.

3. A dusting or spraying apparatus comprising means for carrying the material to be dusted or sprayed, oppositely and laterally directed dispensing nozzles, means for blowing the material from said first mentioned means through said nozzles, a frame supporting said nozzles, and means having central downwardly diverging bars spaced forwardly and rearwardly of said apparatus, a curved band extending substantially horizontally and centrally secured to the rear one of said bars, a yoke having a horizontal top portion secured to the forward one of said bars and having downwardly diverging sides, said band having flat inwardly extending portions adjacent the ends thereof, which portions have flat forwardly extending ends secured to the downwardly diverging sides of said yoke, said band being downwardly flaring and adapted to fit over the horn of a saddle.

4. A dusting or spraying apparatus comprising means for carrying the material to be dusted or sprayed, oppositely and laterally directed dispensing nozzles, means for blowing the material from said first mentioned means through said nozzles, and a centrally disposed vertically extended frame having a substantially horizontally disposed downwardly flaring curved flat band having inwardly directed end portions secured to the lower end of said frame, said curved band being adapted to fit down around the rear of the horn of a saddle and said inwardly extending portions fitting across the front of said horn.

5. A dusting apparatus comprising a pair of cylindrical receptacles disposed side by side, a portion rigidly connecting the same at their front portions, downwardly tapering portions at the bottom of said receptacles, laterally and downwardly disposed nozzles communicating with said portions, a fan casing communicating with each nozzle, a gear casing at the sides of each fan casing and nozzle, oppositely disposed cranks extending into said gear casing, and a frame connecting said receptacles at the rear thereof having vertically disposed bars disposed substantially centrally of said receptacles, said bars, at their lower ends, being secured to a curved downwardly flaring band adapted to extend around the rear portion of the horn of a saddle and across the sides of the front portion thereof, and to wedge down on said horn to rigidly support the device.

6. A dusting or spraying apparatus comprising a receptacle for holding the material to be dusted or sprayed, a nozzle connected to said receptacle, means for discharging the material from said receptacle through said nozzle, and a frame member supporting said apparatus having a downwardly flaring band adapted to fit over and wedge downward on the horn of a saddle, and means secured to the front and rear of said band to which said apparatus is attached.

In testimony whereof I affix my signature.

HENRY E. BRANDT.